(12) United States Patent
Ellingson et al.

(10) Patent No.: US 10,314,461 B2
(45) Date of Patent: Jun. 11, 2019

(54) DISHMACHINE

(71) Applicant: Ecolab USA Inc., St. Paul, MN (US)

(72) Inventors: Jeffrey Paul Ellingson, Minnetonka, MN (US); Wesley Mark Nelson, Grant, MN (US)

(73) Assignee: Ecolab USA Inc., St. Paul, MN (US)

( * ) Notice: Subject to any disclaimer, the term of this patent is extended or adjusted under 35 U.S.C. 154(b) by 620 days.

(21) Appl. No.: 15/014,670

(22) Filed: Feb. 3, 2016

(65) Prior Publication Data

US 2016/0262593 A1 Sep. 15, 2016

Related U.S. Application Data

(63) Continuation of application No. 13/712,329, filed on Dec. 12, 2012, now Pat. No. 9,289,107.

(Continued)

(51) Int. Cl.
*A47L 15/00* (2006.01)
*A47L 15/42* (2006.01)
(Continued)

(52) U.S. Cl.
CPC ......... *A47L 15/4291* (2013.01); *A47L 15/006* (2013.01); *A47L 15/0047* (2013.01);
(Continued)

(58) Field of Classification Search
CPC ............. A47L 15/0047; A47L 15/0057; A47L 15/006; A47L 15/0063; A47L 15/0076; A47L 15/0078; A47L 15/0092; A47L 15/4202; A47L 15/4209; A47L 15/4214; A47L 15/4229; A47L 15/4246; A47L 15/4251; A47L 15/4278; A47L 15/4285; A47L 15/4291; A47L 15/4293; A47L 15/4295; A47L 15/4297; A47L 15/483; A47L 15/488; A47L 15/50; A47L 15/501; A47L 2401/04; A47L 2401/09; A47L 2401/10; A47L 2401/11; A47L 2401/20; A47L 2401/22; A47L 2401/34; A47L 2501/01; A47L 2501/34; C02F 1/008; C02F 1/02; C02F 1/42; C02F 1/441; C02F 1/4691; C02F 5/00; C02F 5/08;
(Continued)

(56) References Cited

U.S. PATENT DOCUMENTS 5,711,606 A 1/1998 Koether
5,729,025 A 3/1998 Erickson et al.
(Continued)

FOREIGN PATENT DOCUMENTS

DE 1926049 11/1970
DE 39 13 355 10/1990
(Continued)

OTHER PUBLICATIONS

European Search Report, dated Mar. 17, 2015 (EP Appln. No. 14197394.1).
(Continued)

*Primary Examiner* — Levon J Shahinian
(74) *Attorney, Agent, or Firm* — Merchant & Gould P.C.

(57) ABSTRACT

The present disclosure relates to a dishmachine that includes one or more features directed to water, energy or material savings. The disclosed dishmachines are still capable of meeting the soil demands of the articles to be cleaned.

15 Claims, 13 Drawing Sheets

Related U.S. Application Data

(60) Provisional application No. 61/569,930, filed on Dec. 13, 2011.

(51) Int. Cl.

| | | |
|---|---|---|
| A47L 15/48 | (2006.01) | |
| A47L 15/50 | (2006.01) | |
| C02F 1/00 | (2006.01) | |
| C02F 1/02 | (2006.01) | |
| C02F 1/42 | (2006.01) | |
| C02F 1/44 | (2006.01) | |
| C02F 1/469 | (2006.01) | |
| C02F 5/00 | (2006.01) | |
| C02F 5/08 | (2006.01) | |
| F25B 27/02 | (2006.01) | |
| F25B 30/02 | (2006.01) | |
| F28D 21/00 | (2006.01) | |
| C02F 103/00 | (2006.01) | |

(52) U.S. Cl.
CPC ....... *A47L 15/0057* (2013.01); *A47L 15/0063* (2013.01); *A47L 15/0076* (2013.01); *A47L 15/0078* (2013.01); *A47L 15/0092* (2013.01); *A47L 15/4202* (2013.01); *A47L 15/4209* (2016.11); *A47L 15/4214* (2013.01); *A47L 15/4229* (2013.01); *A47L 15/4251* (2013.01); *A47L 15/4278* (2013.01); *A47L 15/4285* (2013.01); *A47L 15/4293* (2013.01); *A47L 15/4295* (2013.01); *A47L 15/4297* (2013.01); *A47L 15/483* (2013.01); *A47L 15/488* (2013.01); *A47L 15/50* (2013.01); *A47L 15/501* (2013.01); *C02F 1/008* (2013.01); *C02F 1/02* (2013.01); *C02F 1/42* (2013.01); *C02F 1/441* (2013.01); *C02F 1/4691* (2013.01); *C02F 5/00* (2013.01); *C02F 5/08* (2013.01); *F25B 27/02* (2013.01); *F25B 30/02* (2013.01); *F28D 21/0014* (2013.01); *A47L 15/4246* (2013.01); *A47L 2401/04* (2013.01); *A47L 2401/09* (2013.01); *A47L 2401/10* (2013.01); *A47L 2401/11* (2013.01); *A47L 2401/20* (2013.01); *A47L 2401/22* (2013.01); *A47L 2401/34* (2013.01); *A47L 2501/01* (2013.01); *A47L 2501/02* (2013.01); *A47L 2501/06* (2013.01); *A47L 2501/07* (2013.01); *A47L 2501/18* (2013.01); *A47L 2501/26* (2013.01); *A47L 2501/30* (2013.01); *A47L 2501/34* (2013.01); *C02F 2103/002* (2013.01); *C02F 2209/005* (2013.01); *C02F 2209/055* (2013.01); *C02F 2307/12* (2013.01); *Y02B 40/44* (2013.01); *Y02B 40/46* (2013.01)

(58) Field of Classification Search
CPC .......... C02F 2103/002; C02F 2209/005; C02F 2209/055; C02F 2307/12; F25B 27/02; F25B 30/02; F28D 21/0014; Y02B 40/44; Y02B 40/46
USPC .......................... 134/56 D, 57 D, 58 D, 105
See application file for complete search history.

(56) References Cited

U.S. PATENT DOCUMENTS

| | | | |
|---|---|---|---|
| 5,875,430 A | | 2/1999 | Koether |
| 5,957,144 A | | 9/1999 | Neff et al. |
| 6,463,940 B1 | | 10/2002 | Thomas et al. |
| 7,093,604 B2 | | 8/2006 | Jung et al. |
| 7,329,358 B2 | | 2/2008 | Wilkins et al. |
| RE40,123 E | | 3/2008 | Johansen et al. |
| 7,437,213 B2 | | 10/2008 | Batcher |
| 7,469,704 B2 | | 12/2008 | Fransson |
| 7,650,833 B2 | | 1/2010 | Pardoe et al. |
| 7,676,954 B2 | | 3/2010 | Classen et al. |
| 7,842,137 B2 | | 11/2010 | Classen et al. |
| 7,877,291 B2 | | 1/2011 | Koether et al. |
| 7,927,427 B2 | | 4/2011 | Classen et al. |
| 7,942,978 B2 | | 5/2011 | Holzman et al. |
| 7,942,980 B2 | | 5/2011 | Maier et al. |
| 8,001,810 B1 | | 8/2011 | Tarr |
| 8,010,211 B2 | | 8/2011 | Hendrickson et al. |
| 8,060,408 B2 | | 11/2011 | Koether et al. |
| 8,092,613 B2 | | 1/2012 | Strothoff et al. |
| 8,157,924 B2 | | 4/2012 | Warner et al. |
| 8,176,926 B2 | | 5/2012 | Gaus et al. |
| 8,226,777 B2 | | 7/2012 | Gaus et al. |
| 8,268,083 B2 | | 9/2012 | Rosenbauer |
| 8,307,839 B2 | | 11/2012 | Peukert et al. |
| 8,314,678 B2 | | 11/2012 | Ebrom et al. |
| 8,395,476 B2 | | 3/2013 | Ebrom et al. |
| 8,419,865 B2 | | 4/2013 | Tarr et al. |
| 8,438,882 B2 | | 5/2013 | Rosenbauer |
| 8,440,064 B2 | | 5/2013 | Lee et al. |
| 8,679,261 B2 | | 3/2014 | Brunswick et al. |
| 8,696,827 B2 | | 4/2014 | Ashrafzadeh et al. |
| 8,712,851 B2 | | 4/2014 | Koether et al. |
| 8,753,499 B2 | | 6/2014 | Troshin et al. |
| 8,770,154 B2 | | 7/2014 | Vroom |
| 2006/0021637 A1 | | 2/2006 | Kang |
| 2008/0210279 A1 | | 9/2008 | Hildenbrand |
| 2008/0283099 A1 | | 11/2008 | Peukert et al. |
| 2010/0175718 A1 | | 7/2010 | Kedjierski et al. |
| 2010/0263225 A1 | | 10/2010 | Balerdi Azpilicueta et al. |
| 2010/0294323 A1 | | 11/2010 | Brunswick et al. |
| 2011/0047813 A1 | | 3/2011 | Kuhl et al. |
| 2011/0290282 A1 | | 12/2011 | Lee |
| 2012/0103818 A1 | | 5/2012 | Reinhoudt et al. |
| 2012/0125776 A1 | | 5/2012 | van der Wal et al. |
| 2012/0138470 A1 | | 6/2012 | van der Wal et al. |
| 2012/0217170 A1 | | 8/2012 | van der Wal et al. |
| 2013/0206598 A1 | | 8/2013 | Jung et al. |
| 2013/0248404 A1 | | 9/2013 | Rosenbauer |
| 2013/0333238 A1 | | 12/2013 | Thiyagarajan |
| 2014/0164153 A1 | | 6/2014 | Koether et al. |
| 2014/0190519 A1 | | 7/2014 | Simundic et al. |
| 2015/0173585 A1 | | 6/2015 | Disch et al. |

FOREIGN PATENT DOCUMENTS

| | | |
|---|---|---|
| DE | 44 15 823 | 11/1995 |
| DE | 102004030013 | 1/2006 |
| DE | 102008033741 | 1/2010 |
| EP | 0896695 A2 | 2/1999 |
| EP | 0857328 B1 | 8/2000 |
| EP | 1415587 A2 | 5/2004 |
| EP | 1355560 B1 | 9/2004 |
| EP | 1758056 A2 | 2/2007 |
| EP | 2098485 A2 | 9/2009 |
| EP | 002192370 | 6/2010 |
| EP | 2206686 A2 | 7/2010 |
| EP | 2347999 A2 | 7/2011 |
| EP | 2418997 A1 | 2/2012 |
| EP | 2540207 | 1/2013 |
| EP | 2057928 B1 | 2/2013 |
| EP | 2614764 A2 | 7/2013 |
| EP | 2687142 A2 | 1/2014 |
| EP | 2687143 A2 | 1/2014 |
| EP | 2372603 B1 | 5/2014 |
| EP | 2658430 B1 | 2/2015 |
| EP | 2874530 30 | 5/2015 |
| JP | 1992-263758 | 9/1992 |
| JP | 1995-111965 | 5/1995 |
| JP | 2002-263050 | 9/2002 |
| JP | 2006-192006 | 7/2006 |
| JP | 2007-125198 | 5/2007 |
| JP | 2007117556 | 5/2007 |
| JP | 2007-215792 | 8/2007 |
| JP | 2007-215885 | 8/2007 |

(56) References Cited

FOREIGN PATENT DOCUMENTS

| | | |
|---|---|---|
| JP | 2008-125962 | 6/2008 |
| JP | 2008-267616 | 11/2008 |
| JP | 2010-233651 | 10/2010 |
| KR | 10-0843516 | 7/2008 |
| WO | WO 01/85003 | 11/2001 |
| WO | WO 2005/020782 A1 | 3/2005 |
| WO | WO2007/021562 | 2/2007 |
| WO | WO 2010/087763 A1 | 8/2010 |
| WO | WO 2010/120657 | 10/2010 |
| WO | WO2014014858 A2 | 1/2014 |

OTHER PUBLICATIONS

International Search Report and Written Opinion for PCT/US2012/069272 dated Apr. 29, 2013.

DISHMACHINE

CROSS-REFERENCE TO RELATED APPLICATION

This application is a continuation application of U.S. application Ser. No. 13/712,329, filed Dec. 12, 2012, which claims the benefit of U.S. Provisional Application No. 61/569,930, filed Dec. 13, 2011, entitled "Dishmachine," both of which are incorporated by reference herein in their entirety.

BACKGROUND

Dishmachines, particularly commercial dishmachines, have to effectively clean a variety of articles such as pots and pans, glasses, plates, bowls, and utensils. These articles include a variety of soils, including protein, fat, starch, sugar, and coffee and tea stains, which can be difficult to remove. At times, these soils may be burned or baked on, or otherwise thermally degraded. Other times, the soil may have been allowed to remain on the surface for a period of time, making it more difficult to remove. Dishmachines remove soil by using strong detergents, high temperatures, sanitizers, or mechanical action from copious amounts of water. It is against this background that the present disclosure is made.

SUMMARY

The present disclosure relates to a dishmachine that includes one or more features directed to water, energy or material savings. The disclosed dishmachines are still capable of meeting the soil demands of the articles to be cleaned.

Figure 1A:
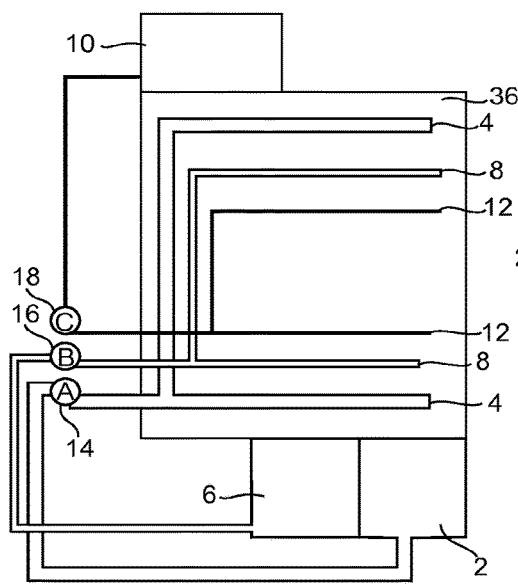
FIGS. 1-A to 1-D show schematics for fluid motion within the dishmachine.
Figure 1B:
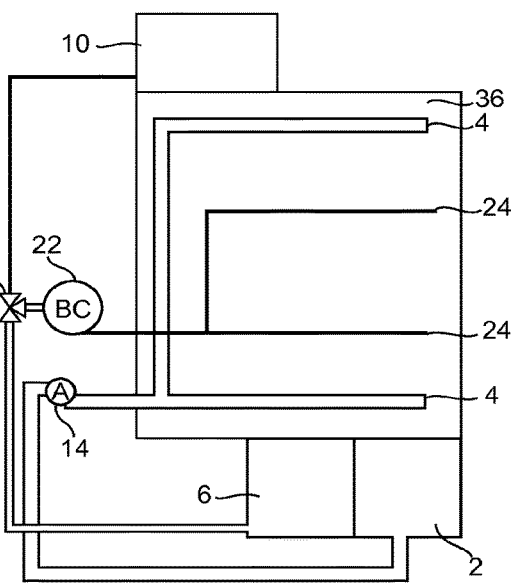
Figure 1C:
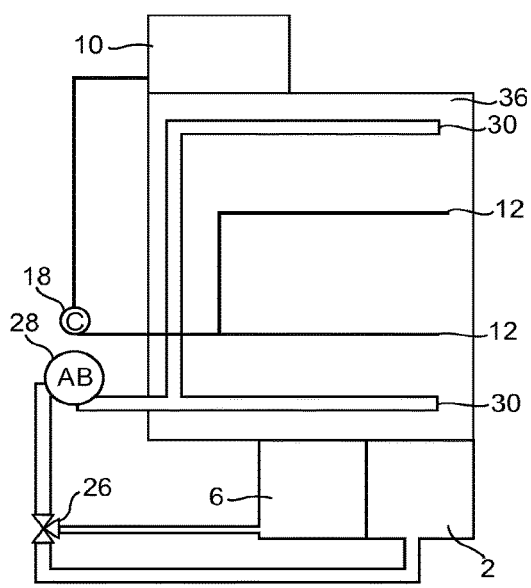
Figure 1D:
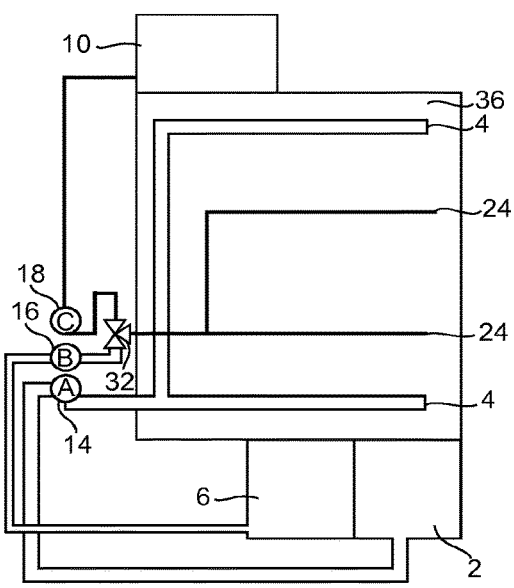

In accordance with common practice, the various described features are not drawn to scale but are drawn to emphasize specific features relevant to the disclosure. Reference characters denote like features throughout the Figures.

DETAILED DESCRIPTION

The present disclosure relates to a dishmachine that includes one or more features directed to water, energy or material savings while meeting the soil demands of the articles to be cleaned.

Examples of water savings include using less water in the overall dish machine cycle, reusing water, or recycling water. Examples of energy savings include using less energy to heat water, and capturing heat and using the heat for other purposes. Examples of material savings include using less chemistry to clean the articles or using less metal in the overall dishmachine installation. These will now be discussed in more detail as it relates to specific features of the dishmachine.

Water Savings

Dishmachines use copious amounts of water to clean dishes. A typical institutional door-style or hood-style dishmachine uses from about 0.8 to about 1.2 gallons of water per cycle. A typical restaurant runs from about 25 to about 350 cycles per day. Which means, a restaurant uses from about 20 to about 420 gallons of water per day to clean dishes, pots and pans, glasses, and utensils. The disclosed dishmachine includes multiple features for reducing the amount of water used without sacrificing cleaning efficacy.

Pumped Final Rinse

In some embodiments, the dishmachine can use a pumped final rinse to save water. In this embodiment, the pump may draw rinse water from a source such as the final fresh rinse water accumulation tank (tank C 10 in FIG. 1) or the recovered water of the boosted wash (tank B 6 in FIG. 1), also called the power rinse tank. The tank may be selectable by using a multiple position valve 20 on the pump 22 inlet. The pump may also discharge water to any or all of the wash arms, final rinse arms, or power rinse arms via a multiple position valve. This saves water by reusing water that is already in one of the existing tanks of the dishmachine and eliminates or reduces the need to rely on fresh water for the rinse. One challenge with using water from an existing tank is that the water in the tank likely includes other detergents and soils from the articles in the dishmachine. Any chemistry used in the final rinse must be able to overcome any issues associated with using water from shared tanks.

FIG. 1 generally shows the schematics for fluid motion through a dishmachine with a wash chamber 36. FIG. 1-A shows a method in which each of the three fluids are pumped through separate systems. System A includes the tank A 2, spray arm A 4, and pump 14. System B includes the tank B 6, the spray arm B 8, and the pump 16. System C includes tank C 10, spray arm 12, and pump 18. Tank C is replenished with freshwater from an external source. Note that each spray arm is shown as including a top arm and a bottom arm but it is understood that both arms may not be required or one or both arms could be substituted with fixed nozzles. System A represents the wash system, System B represents the boosted wash or power rinse system, and System C represents the final freshwater rinse system. The benefit of the method shown in FIG. 1-A is that each system can be optimized for that particular fluid by pump, tank, and nozzle selection. FIG. 1-B shows a method in which the boosted wash (System B) and final freshwater systems (System C) are joined at the pump inlet by an actuated 3-way valve 20. This allows a single pump 22 to be used to apply the booster fluid and the final rinse fluid through a single set of spray arms 24. The benefit of this is that fewer pumps and spray arms are required. FIG. 1-C shows a method in which the boosted wash (System B) and wash systems (System A) are joined at the pump inlet by an actuated 3-way valve 26. This allows a single pump 28 to be used to apply the booster fluid and the wash fluid through a single set of spray arms 30. The benefit of this is that fewer pumps and spray arms are required. FIG. 1-D shows an alternate to FIG. 1-B in which the boosted wash (System B) and final freshwater systems (System C) are joined at the pump outlet by a three-way valve 32. This allows for optimization of the pump for each application.

Figure 10A:
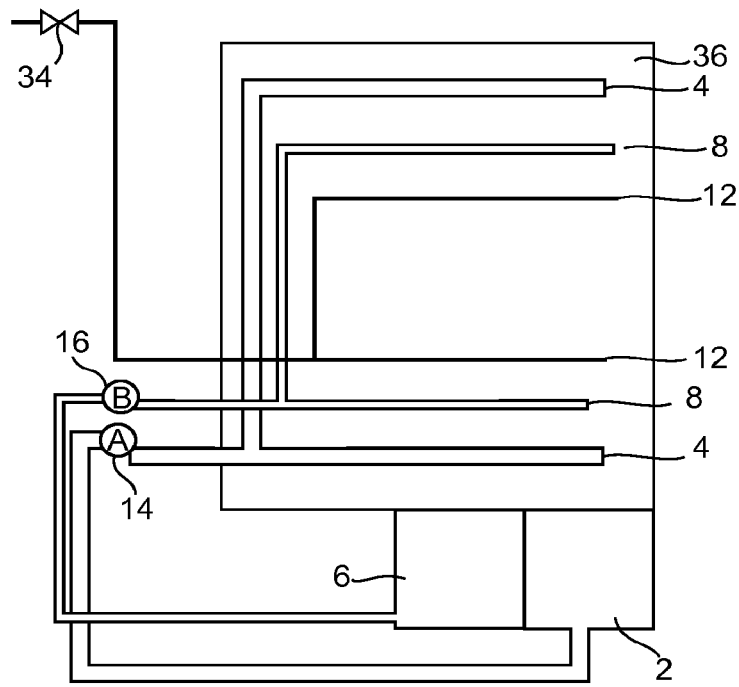
FIGS. 10-A and 10-B show schematics of alternate methods for fluid motion within the dishmachine.
Figure 10B:
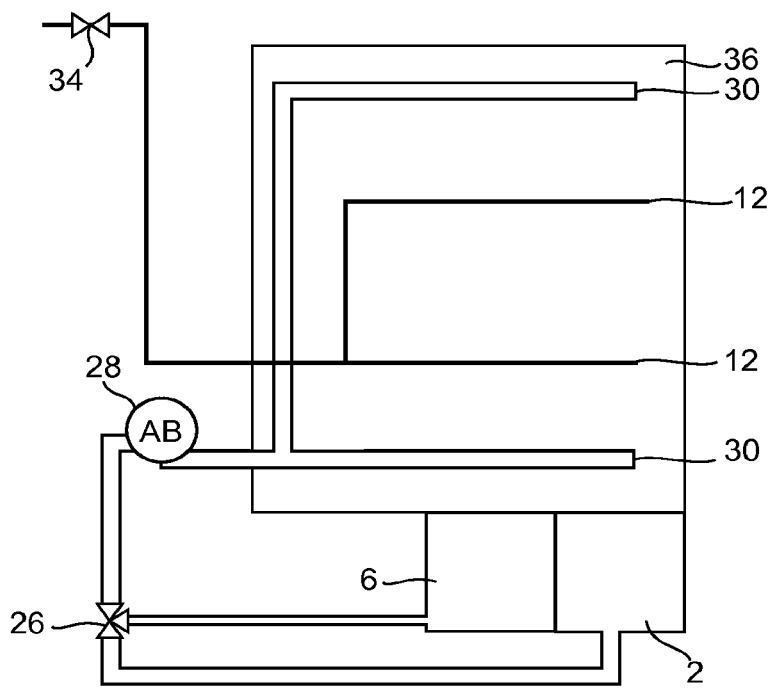

In an alternate configuration, a pressurized freshwater source can be utilized in place of the pumped freshwater source (tank C 10 in FIG. 1). In this case, the pressurized water can enter the system at valve 34 as seen in FIG. 10. FIG. 10-A is identical to FIG. 1-A with the exception that the freshwater source is pressurized without the aid of a final rinse pump 18 from tank C 10 and is controlled by the positioning of an automatically operated valve 34 as opposed to the starting and stopping of the rinse pump 18. FIG. 10-B is identical to FIG. 1-C with the exception that the freshwater source is pressurized without the aid of a final rinse pump 18 and is controlled by the positioning of an automatically operated valve 34 as opposed to the starting and stopping of the rinse pump 18.

Automated and Smart Dump and Fill

Figure 2A:
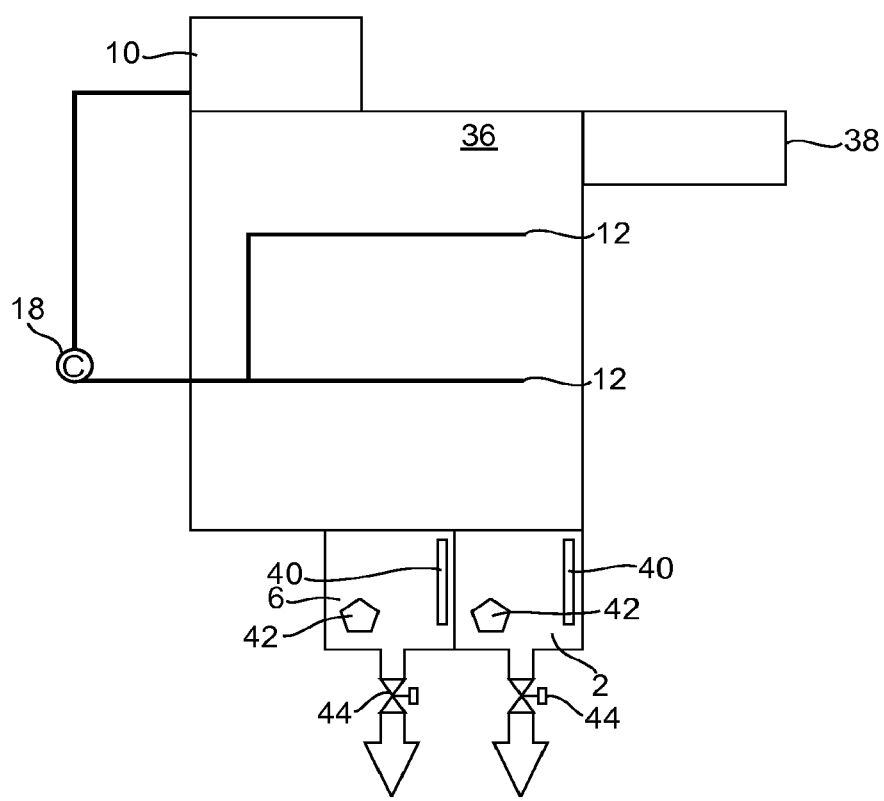
FIGS. 2-A to 2-B show a schematic of an automatic dump and fill system and the corresponding logic.
Figure 2B:
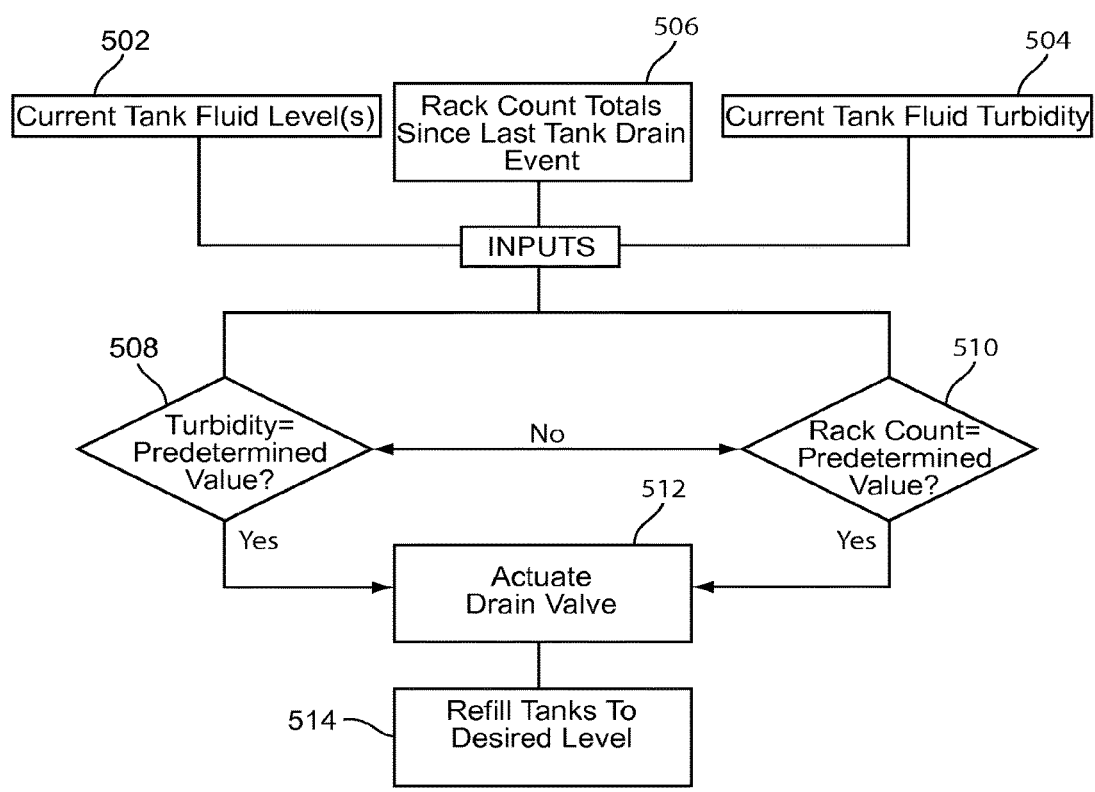

In some embodiments, the dishmachine can incorporate an automated tank dump and fill that could be incorporated on both or either of the dishmachine fluid tanks. This feature automatically drains and fills, either completely or partially a volume of water from the dishmachine, and is shown in FIG. 2-A. The dishmachine could automatically drain and fill the machine in response to a change in the wash tank. Such a change could include the wash tank becoming too dirty, which could be determined by completing a certain predetermined number of wash cycles, or in real time by a sensor such as a turbidity sensor 42 that actually measures the turbidity of the tank and coordinates with the controller 38 to open and close valves 44 to drain the tanks 2 and 6. This saves a substantial amount of water and chemistry by not prematurely draining the tank before it is dirty. This also ensures that the concentration of foodsoil does not become too great such that the rinse system of the dishmachine cannot properly rinse the ware. The automated dump and fill process may be controlled using drain and fill valves with a level sensor 40.

FIG. 2-B shows an example of the logic the dishmachine controller 38 can use to drain and refill the dishmachine tanks 2 or 6 in response to feedback from the turbidity sensors 42. The controller 38 receives feedback on the fluid levels in tanks 2 and 6 from the level sensors 40 (shown at 502). The controller 38 optionally receives feedback on the turbidity of tanks 2 and 6 from the turbidity sensors 42 (shown at 504). Finally, the controller may optionally include a count to determine the number of racks washed since the last drain event (shown at 506).

In some embodiments, the rack count simply counts the number of racks that go through the machine. In some embodiments, the rack count is a smart rack count that, together with a rack identification system, counts the number and type of rack and uses a weighted algorithm to determine when to drain and fill the machine after a certain number of a certain type of rack goes through the machine. For example, pots and pans are typically dirtier than glasses. So, ten pot and pan racks would have more soil than 10 glass racks. A weighted rack counting system would take into account the soil load typically associated with certain racks. An exemplary algorithm includes the following: dump and fill the machine when ((rack type A)*X)+((rack type B)*Y)+((rack type C)*Z)=predetermined value, where X, Y, and Z are values intended to give more weight to pot and pan racks, less weight to racks for plates and bowls, less weight to racks with utensils, and less weight to racks with glassware. More or less racks could be added to the algorithm to accommodate additional or fewer rack types.

The controller takes inputs 502, 504, and 506 and determines if the turbidity measurement (508) or the rack count measurement (510) has hit a predetermined value. The predetermined values would be programmed into the controller 38 so that the controller would know how many racks to wash before draining and refilling the tank or tanks. Likewise, the controller 38 would be programmed to know how high the turbidity measurement could go before draining and refilling the tank or tanks. Once either the turbidity measurement or the rack count reached the predetermined value, the controller 38 would actuate the drain valve 44 on the tank or tanks to partially or completely drain them (shown at 512) and then refill them to the desired level (514) as determined by the level sensors 40.

Figure 3:
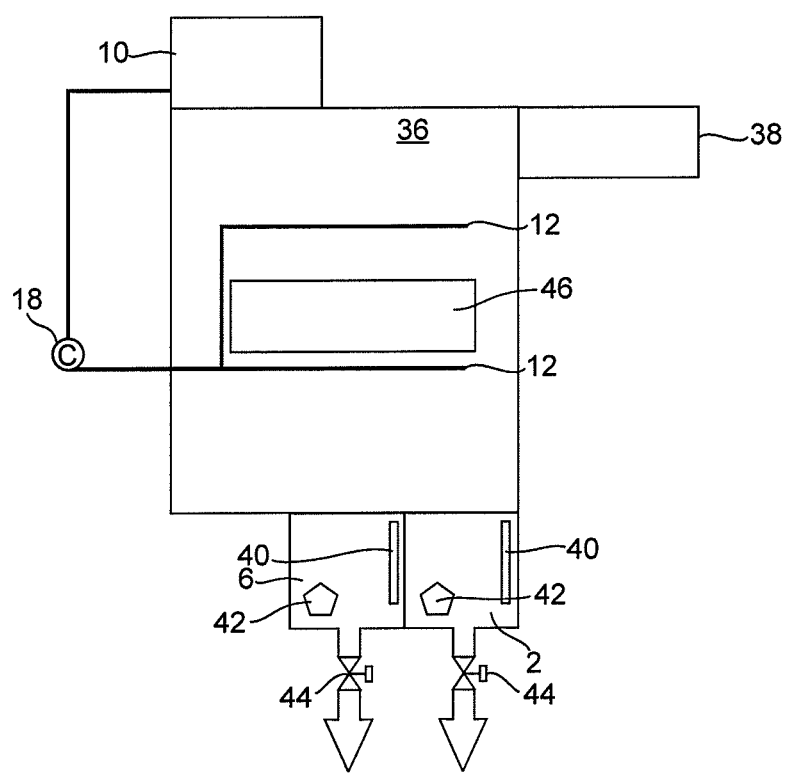
FIG. 3 shows a schematic of a smart automatic dump and fill system.

The smart dump and fill system is shown in FIG. 3. The dishmachine controller 38 is programed to adjust how frequently the dishmachine drains and refills in response to use of the dishmachine. For example, during periods of high use, the machine would be programed to drain and refill more frequently and during periods of low use, the machine would be programed to drain and refill less frequently. "Use" can be determined by counting wash cycles. "Use" may also be determined by considering the contents of the dish racks 46. For example, restaurants wash more pots and pans in the morning as they are preparing food for the day. The dishmachine controller 38 can be programed to identify those racks 46 as "pot and pan" racks and drain and refill the dishmachine more frequently than if the same number of racks of glasses go through the machine. How the dishmachine determines the content of the rack is discussed below in more detail and in U.S. Pat. Nos. 7,437,213 and 6,463,940, which are incorporated herein by reference. Said differently, the dishmachine could be programed to dump and fill after 10 pot and pan racks, 100 racks of plates, 400 racks of glasses, or some logical combination of the rack totals. The purpose of this would be to take into account the relatively high soil content of pots and pans versus plates, glasses, or utensils.

Integrated Water Conditioner

In some embodiments, the dishmachine can incorporate an integrated water conditioning system. Water conditioning that is built into the dishmachine avoids the need for an extra, external, water conditioning system. And because the integrated system is only associated with the dish machine, the only demands on the system are those of the dishmachine, and not the rest of the water used in the kitchen or facility. Integrating the water conditioning system into the dishmachine has further benefits: water quality can be observed and analyzed by the machine, and adjustments to the level of conditioning can be made. Traditional water treatment systems employ open loop control schemes. Water is treated at a predetermined rate, and regardless of use, efficiency, or performance, the level of treatment remains constant. Technologies such as conductivity probes may be utilized to monitor the hardness of the treated water; this can provide closed loop feedback to the system allowing real-time adjustments to the level of water treatment to maintain the desired results. This may lead to significant improvements in both water conditioning effectiveness and efficiency. In the scenario where the dishmachine is in a low volume or storage state, the level of water treatment can be reduced or disabled to match the lower needs of the machine. Likewise, if the machine is undergoing a high volume scenario, the level of water treatment can be increased to sustain premium results. The condition of the treated water may also be used by the smart controller to adjust chemistry and machine parameters on the fly. The amount of chemistry used can be increased or decreased to adapt to the incoming water condition. Similarly, various machine control parameters can be adjusted to aid in overall performance based on water condition. For example, if the water has a higher than expected hardness level, the wash and/or rinse cycle times can be adjusted in real-time. All of these real-time adjustment scenarios permit the machine to maintain optimal results regardless of the condition of the water. Several integrated water conditioning systems may be used. In some embodiments, the integrated water treatment system is an onboard water softener. In some embodiments, the integrated water treatment system is a capacitive deionization system such as the one described in patent applications US 2012/0138470, US 2012/0125776, US 2012/0217170, and US 2012/0103818. In some embodiments, the integrated water treatment system is an onboard reverse osmosis system. In some embodiments, the integrated water treatment system utilizes an ion exchange resin regenerated by an acid, such as the ones described in the patent applications titled Acid Regeneration of Ion Exchange Resins for Industrial Applications, and Integrated Acid Regeneration of Ion Exchange Resins for Industrial Applications, both filed concurrently herewith.

Dish Racks

For every type of rack, a specific washing sequence may be programmed into the dishmachine controller. These washing sequences can adjust the amount of chemistry used (acidic detergents, alkaline detergents, rinse aid, etc.) or the machine cycles themselves. For instance, an acid cycle may be run before an alkaline cycle for a specific type of food soil to achieve better results. Another option alternates the pH level of the detergent repeatedly to remove a specific type of soil. An example of this type of soil would be starch or coffee stains. Glasses benefit from a pre-rinse application of the acidic product to neutralize any alkalinity from the wash cycle. They also benefit from an extended rinse cycle with additional rinse aid. In some embodiments, the dishmachine controller can detect if a rack was washed with a complete cycle or not. If the cycle is determined to be interrupted for a given rack (based on the position of the door switch and the rack not being identified within the dishmachine) and is not restarted or completed for that rack, an indicator may alert the operator of the incomplete wash sequence and suggest that the rack be rewashed. Statistics on the number of incomplete wash cycles may be collected and compiled into a report to provide an overall dishmachine "success rate" and help identify causes of the incomplete cycles.

Rewashing Racks

A concept that is related to the concept of complete cycles, is the concept of rewashing racks or articles. In some embodiments, the dishmachine can determine the number of types of articles and ware that are rewashed based on the amount of time that elapsed between a specific rack of ware exiting and reentering the machine. Each rack may have an ability to communicate not only the type of rack (i.e., pot and pan, glasses, dishes, etc.), but also a unique rack identifier such as a serial number. If the amount of time from the end of a successful wash cycle for a given rack to the start of the wash cycle for that exact rack is less than the amount of time it would take to empty and refill the rack, it may be flagged as a rewashed rack. This time could be between 10 seconds to 2 minutes. The time used for the alarm would benefit from adjustability so it can be customized to the specific operation of the installation site. A report can be generated with rewash information and used in various ways such as operator training, machine maintenance, chemistry adjustments and chemistry selection. Furthermore if a rack is flagged it can be reinserted into the dishmachine and the machine can be reprogrammed to alter the cleaning cycle to address stubborn soils that forced the rewash.

Energy Savings

Dishmachines use a considerable amount of energy between the electricity required to run the machine and the energy required to heat the water used in the machine. High temperatures are used in dishmachines for soil removal and sanitizing. Exemplary temperatures used in dishmachines include 150-165° F. wash water and 165-180° F. rinse water for hot water temperature sanitizing machines and 120-140° F. wash and rinse water temperatures for chemical sanitizing machines. In a typical dishmachine process, the majority of the energy in the hot water is lost, either as vapor or disposed of down the drain when the dishmachine tank is drained or overflows.

Some of the water saving features described above are also energy saving. For example, by draining and refilling a dishmachine tank less frequently, less water needs to be heated up. Creating smarter dishmachines with less frequency of incomplete cycles or rewashed racks will ultimately use less water, and therefore less hot water. Specific energy saving features will now be described.

Insulated Paneling

Figure 4:
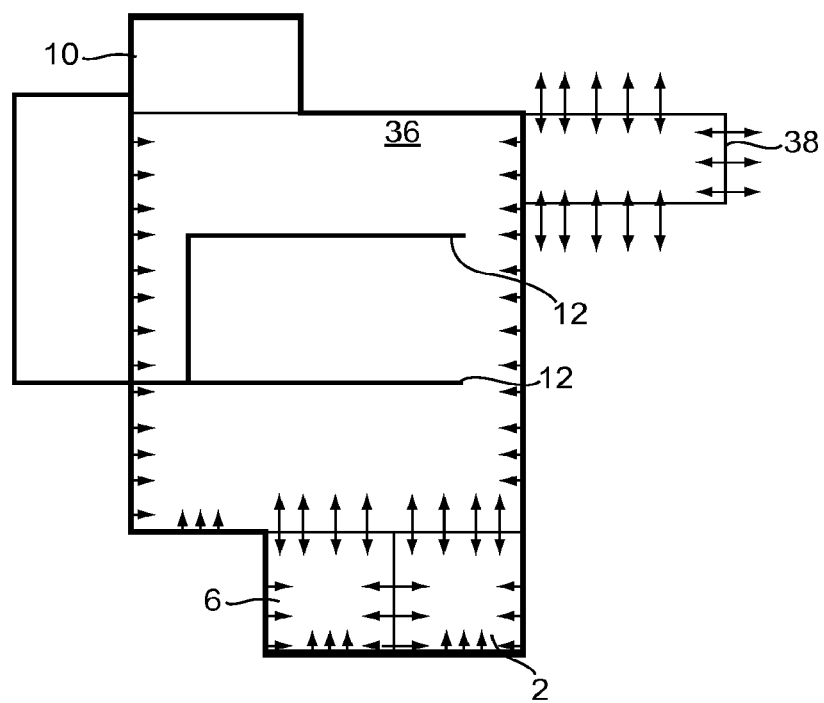
FIG. 4 shows a schematic of insulated paneling.

In some embodiments, the dishmachine includes insulated paneling on the exterior of the machine. The insulation helps with noise reduction, and also heat loss from the machine. Decreasing the rate of heat loss from the dishmachine in turn decreases the frequency that any heater(s) on the dishmachine need to be used to maintain the temperature of the water in the tanks of the machine. An example of insulated paneling is shown in FIG. 4. Specifically, FIG. 4 shows a dishmachine similar to that of FIG. 2. The arrows in FIG. 4 indicate the flow of heat across a surface. For example, a double sided arrow, such as that shown around the controller 38 indicates a boundary of relatively high thermal conductivity which encourages heat transfer. This type of surface may be solid or perforated and is recommended for use when heat transfer between two adjacent materials is desirable. Examples of materials with high thermal conductivity include stainless steel (10-20 gauge), carbon steel, iron, nickel, brass, silver, copper and combinations or alloys of these. These materials could also be layered with cladding such as stainless steel cladding over aluminum. In contrast, a single sided arrow, such as that shown around the wash chamber 36 and around tank A 2 and tank B 6 represents a boundary of relatively low thermal conductivity, which discourages heat transfer. This will minimize heat loss to both the surrounding dishmachine environment and any dishmachine components that are sensitive to heat. Examples of materials with low thermal conductivity include a certain thickness of foam or fiberglass insulation clad in stainless steel (10-20 gauge), porcelain, nylon, polymers such as PTFE, PVC, HDPE, and polystyrene, fiberglass, air, and combinations of these. An exemplary combination of these materials includes the use of a material with an air-filled internal chamber. This would decrease overall weight, thermal conductivity, and cost. Another exemplary combination is the use of an open or closed cellular structure that is embedded with air or other gasses directly into the material. FIG. 4 shows that heat can be contained within the wash chamber 36 by using materials with low thermal conductivity along the exterior of the machine and while allowing materials with high thermal conductivity within the confines of the dishmachine. FIG. 4 also shows that high thermal conductive materials are suitable for components that are sensitive to heat such as electronic components like the controller 38.

Heat Recovery System

In some embodiments, the dishmachine is designed to reduce the amount of heat lost from the machine. Dishmachines lose heat primarily through the drained or displaced water through the floor drain as well as hot water vapor exhausted to the environment outside of the dishmachine. Heat loss due to drained or displaced water can be minimized by reducing the overall water consumption of the dishmachine. Heat loss due to hot water vapor can be minimized by capturing and condensing the vapor. The disclosed dishmachine helps reduce the amount of heat lost through one of several embodiments.

Figure 5:
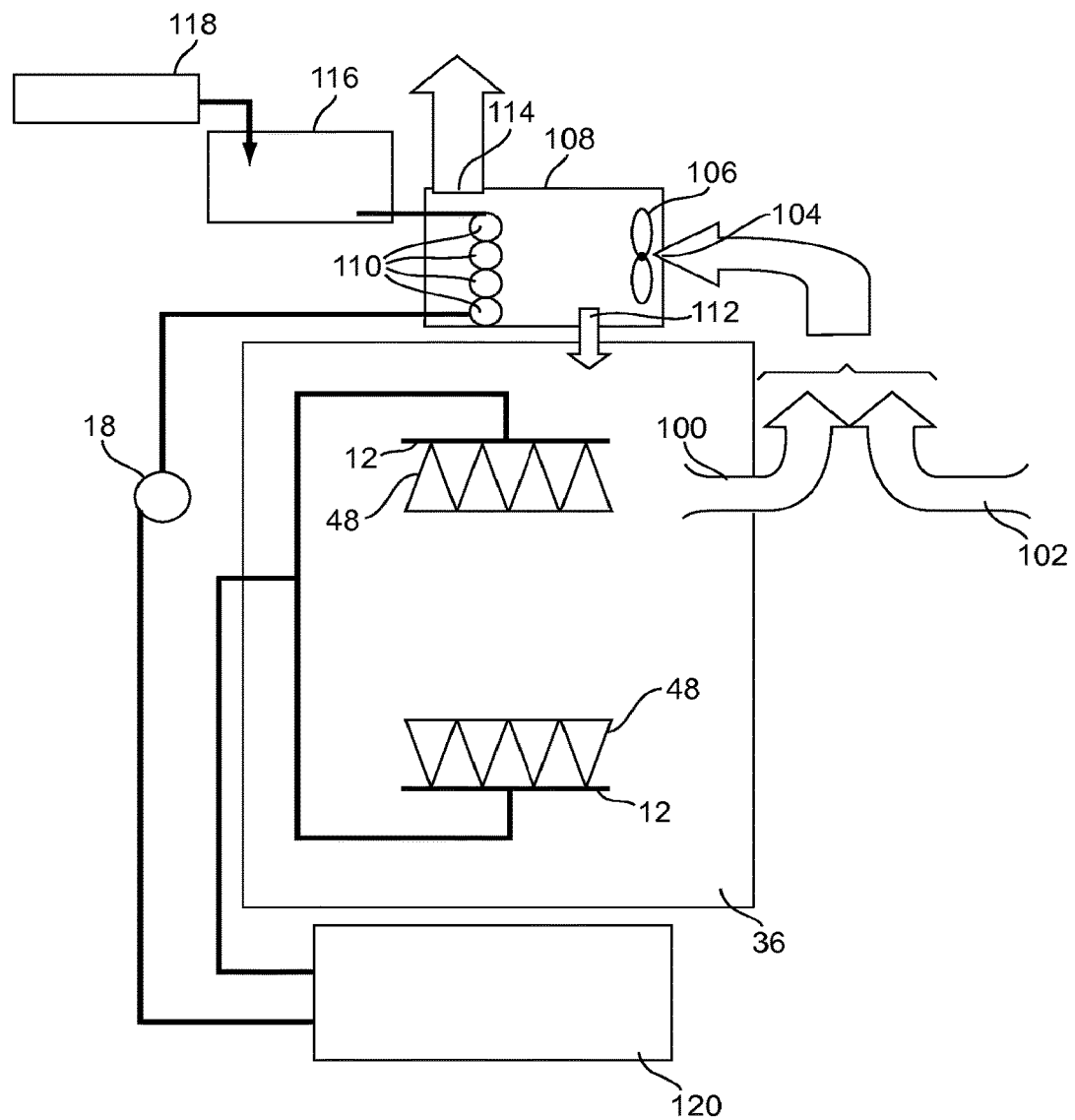
FIG. 5 shows a schematic of a heat recovery system.

For example, FIG. 5 shows an embodiment of a dishmachine that incorporates a single or multiple stage heat recovery system. In FIG. 5, warm moist air is drawn from the inside of the machine at outlet 100. Warm moist air may optionally also be drawn from the environment surrounding the dishmachine at 102. The air from outlet 100 and the environment 102 is drawn into a heat exchanger 108 through inlet 104. Note that inlet 104 may be a simple hole that air is drawn into, in which case the arrows in FIG. 5 represent the path that vapor would follow to flow into the inlet 104. Alternatively, inlet 104 could be connected to outlet 100 with a duct, or pipe such that air flows directly from the machine outlet 100 and into inlet 104. In this situation, inlet 104 could optionally also include another hole from which to draw in air from the environment 102. In this embodiment, inlet 104 could also include a valve that could select between drawing air in from outlet 100, from the environment 102 or both.

The air may be drawn into the heat exchanger 108 by a fan 106. Once inside the heat exchanger 108, a fan 106 or convection extracts the heat from the warm moist air from the machine and surrounding environment by drawing the air across shell- or tube-type heat exchanger(s) 110. The heat captured in heat exchanges 110 is then used to preheat incoming water from the fluid accumulator 116. Once the heat is removed from the warm moist air coming from the machine or the environment, the relatively cool, dry air is exhausted out the top of the heat exchanger 108 at vent 114. Any water that has been condensed inside of the heat exchanger 108 can be drained back into the machine at drain 112. This process reduces or eliminates reliance on traditional heaters. A booster heater 120 may be incorporated into the dishmachine to supplement heating of the incoming water as needed.

Figure 6:
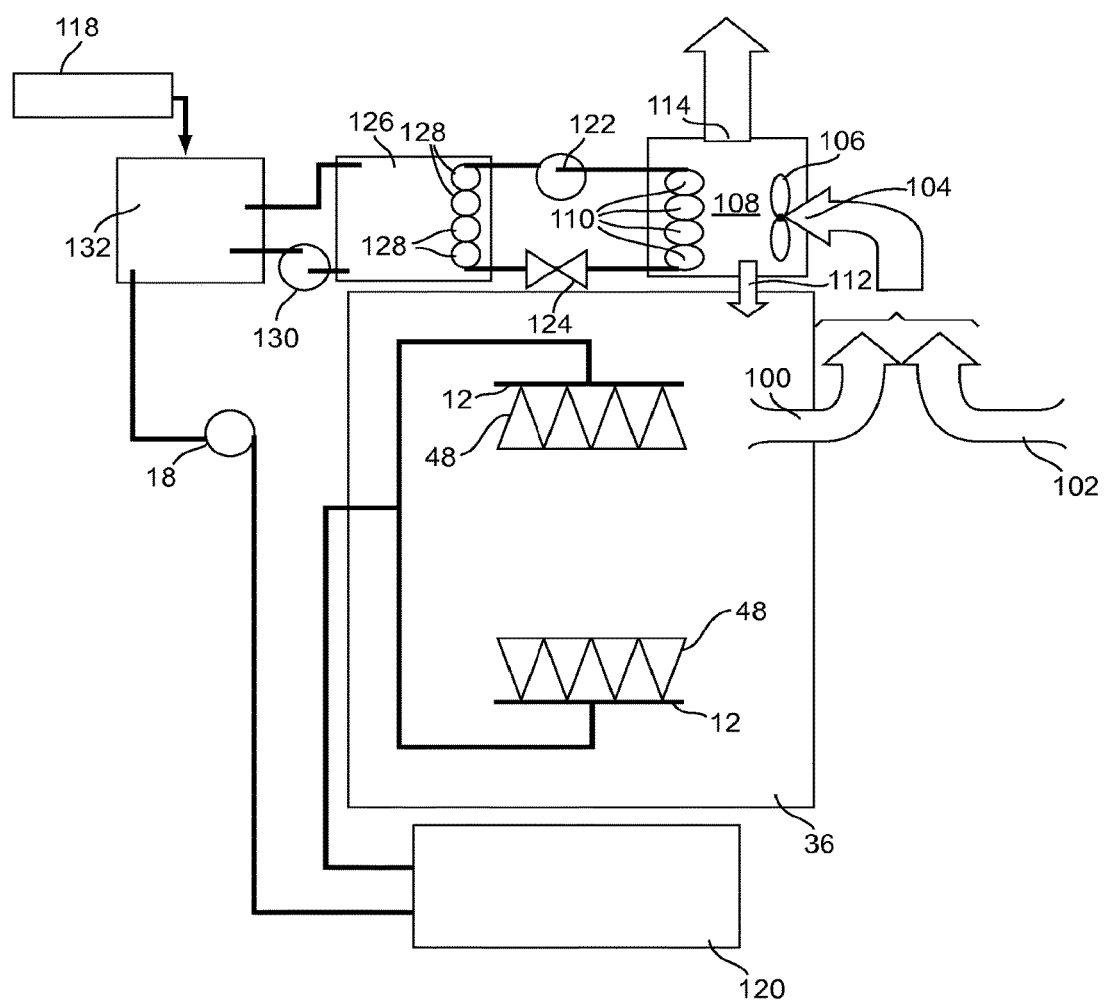
FIG. 6 shows a schematic of a refrigerant boosted heat recovery system.
Figure 7:
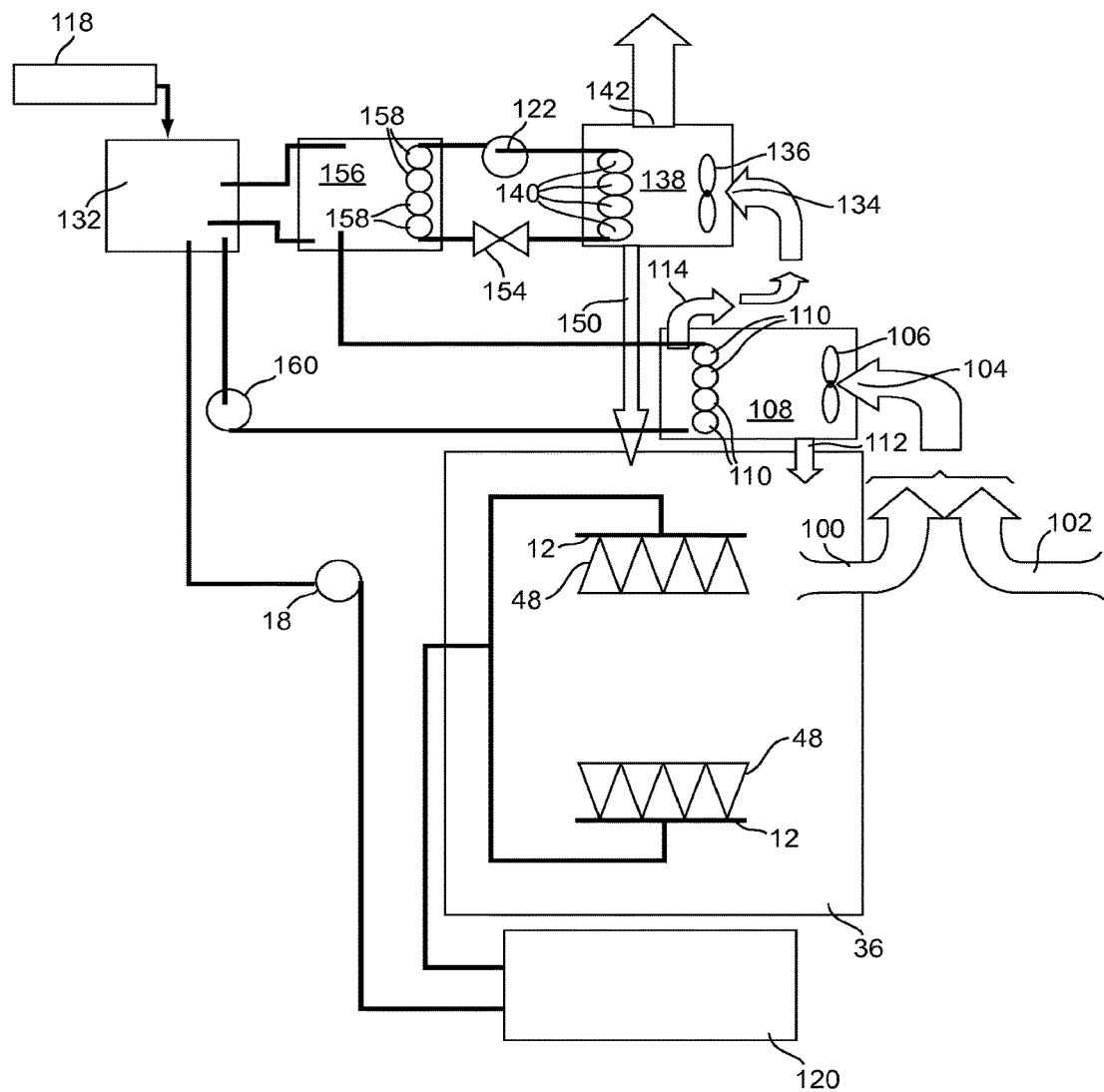
FIG. 7 shows a schematic of a dual stage refrigerant boosted heat recovery system.

In some embodiments, the dishmachine uses a refrigerant-boosted heat recovery process. FIG. 6 shows a refrigerant-boosted heat recovery process that uses a single step. FIG. 7 shows a refrigerant-boosted heat recovery process that uses a multiple step process with at least one stage being boosted by refrigerant.

FIG. 6 shows a dishmachine that collects warm moist air from the inside of the dishmachine at outlet 100 and optionally from the environment surrounding the dishmachine at 102. The warm moist air is collected and channeled to an inlet 104, which sends the air into a heat exchanger 108. The heat exchanger 108 may include a fan 106 to help collect the air and direct it across the heat exchanger coils 110. As in FIG. 5, inlet 104 may be a simple hole that air is drawn into, in which case the arrows in FIG. 6 represent the path that vapor would follow to flow into the inlet 104. Alternatively, inlet 104 could be connected to outlet 100 with a duct, or pipe such that air flows directly from the machine outlet 100 and into inlet 104. In this situation, inlet 104 could optionally also include another hole from which to draw in air from the environment 102. In this embodiment, inlet 104 could also include a valve that could select between drawing air in from outlet 100, from the environment 102 or both.

Once the heat has been removed from the air from 100 and 102, the dry cool air is sent up the exhaust 114 and the cooled, condensed water is drained back into the dishmachine at drain 112. In FIG. 6, the coils 110, compressor 122, coils 128, and the expansion valve 124 form a heat pump where the coils 110 and 128 are filled with Freon. In use, the heat from the dishmachine vapor is removed from the vapor and transferred to the Freon inside coils 110. That heat is moved over to the condenser coils 128 where it is pulled out and used to heat fluid from the fluid accumulator 132. Incoming water from fluid supply 118 flows into the fluid accumulator 132. Water from the fluid accumulator 132 is pumped into the condenser 126 where it pulls the heat out of coils 128 before being pumped back into the fluid accumulator 132. The warmed water in the fluid accumulator 132 is then pumped by pump 18 to an optional booster heater 120 before being used in the machine. In some embodiments, the heat from the heat pump system is able to heat the water in the fluid accumulator 132 up to 100° F. In some embodiments, the heat from the heat pump system is able to heat the water in the fluid accumulator 132 by 15° F., 30° F., or 45° F.

FIG. 7 shows a dishmachine that collects warm moist air from the inside of the dishmachine at outlet 100 and optionally from the environment surrounding the dishmachine at 102. The warm moist air is collected and channeled to an inlet 104, which sends the air into a heat exchanger 108. The heat exchanger 108 may include a fan 106 to help collect the air and direct it across the heat exchanger coils 110. As with FIGS. 5 and 6, inlet 104 may be a simple hole that air is drawn into, in which case the arrows in FIG. 7 represent the path that vapor would follow to flow into the inlet 104. Alternatively, inlet 104 could be connected to outlet 100 with a duct, or pipe such that air flows directly from the machine outlet 100 and into inlet 104. In this situation, inlet 104 could optionally also include another hole from which to draw in air from the environment 102. In this embodiment, inlet 104 could also include a valve that could select between drawing air in from outlet 100, from the environment 102 or both.

Once the heat has been removed from the air from 100 and 102, the air from the heat exchanger 108 is sent up the exhaust 114 and the cooled, condensed water is drained back into the dishmachine at drain 112. The air sent up exhaust 114 is collected at inlet 134 and sent through another heat exchanger 138. As with the first heat exchanger, inlet 134 may be a simple hole that air is drawn into, in which case the arrows from exhaust 114 to the inlet 134 represent the path that vapor would follow to flow into inlet 134. Alternatively, inlet 134 could be connected to exhaust 114 with a duct or pipe such that air flows directly from exhaust 114 to inlet 134. Heat exchanger 138 may also include a fan 136 to assist with collecting the air and moving the air across coils 140. In FIG. 7, the coils 140, compressor 122, coils 158, and the expansion valve 154 form a heat pump where the coils 140 and 158 are filled with Freon. In use, the heat from the dishmachine vapor is removed from the vapor and transferred to the Freon inside coils 140. That heat is moved over to the condenser coils 158 where it is pulled out and used to heat fluid from the fluid accumulator 132. Incoming water from fluid supply 118 flows into the fluid accumulator 132. Water from the fluid accumulator 132 is pumped into the condenser 156 where it pulls the heat out of coils 158 before being pumped back into the fluid accumulator 132. The warmed water in the fluid accumulator 132 is then pumped by pump 18 to an optional booster heater 120 before being used in the machine. In some embodiments, the heat from the heat pump system is able to heat the water in the fluid accumulator 132 up to 100° F. In some embodiments, the heat from the heat pump system is able to heat the water in the fluid accumulator 132 by 15° F., 30° F., or 45° F.

Once additional heat is removed from the air in heat exchanger 138 the cool dry air is sent out exhaust 142 and any additional condensed water is allowed to drain back into the dishmachine through drain 150.

Figure 8:
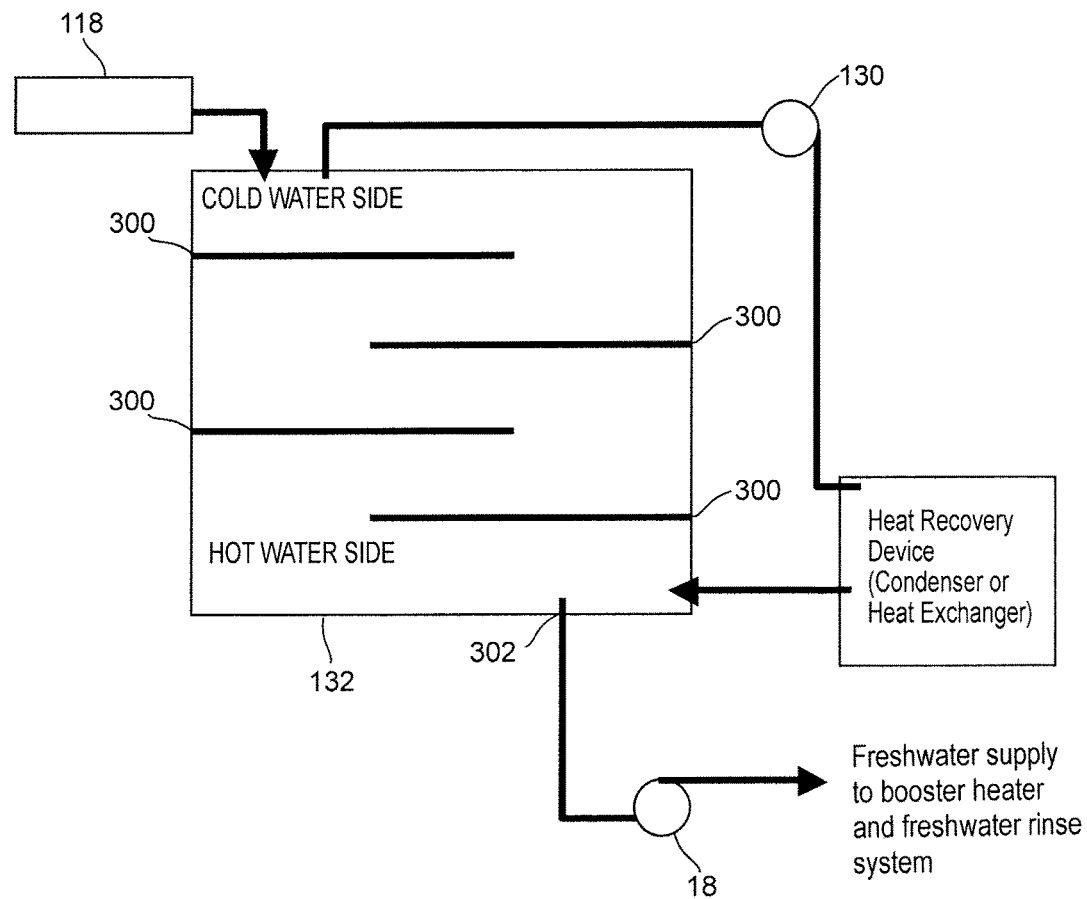
FIG. 8 shows a schematic of a recirculated fluid accumulator.

FIG. 8 shows a more detailed view of the fluid accumulator 132. Cold water enters the fluid accumulator 132 from the fluid supply 118. Water in the fluid accumulator 132 is gradually heated up by recirculating the fluid in the fluid accumulator 132 through the coils in the condenser 126 and/or heat exchanger 108 via recirculation pump 130. The optional baffles 300 in the fluid accumulator 132 help maintain a temperature gradient across the fluid accumulator 132 so that the cold water from the fluid supply 118 is at least partially separated from the warmer water that has been recirculated through the condenser 126 and optionally the heat exchanger 108. This also allows the hottest re-circulated water to be most near the outlet 302 that supplies the wash chamber 36. The water leaving the fluid accumulator 132 is pumped using fluid pump 18 which transports the water through an optional booster heater 120 and onto the arms 12 in the wash chamber 36.

There are several advantages with using a heat recovery system. For example, the heat transfer capacity of the heat recovery system can be specified and matched to the expected heat load of the dishmachine and potentially exceeded allowing for recovery of heat loads other than the dishmachine. This is beneficial in institutional kitchens which are often hot and humid environments due to the continuous use of stoves, ovens, and hot water and would allow for the recovery of heat from these other appliances. The heat recovery system is also beneficial because it can operate independent of the dishmachine cycle and continue capturing heat from the environment surrounding the dishmachine, even if the dishmachine is not running or is generating little to no vapor. The heat recovery system is also beneficial because it can be used with both high temperature and low temperature dishmachines. It also lowers the total water usage by incorporating the condensate back into the dishmachine. Further, the heat recovery system also reduces the vapor released from the dishmachine. This is beneficial in that it may eliminate the need for installing expensive, complicated, and material intensive vents typically associated with dishmachines. It may also reduce heating and air conditioning costs used to offset the release of vapor into the area around the dishmachine, which would be an additional significant energy savings.

In some embodiments, the dishmachine may include a vapor vent, such as the one described in U.S. Pat. No. Re 40,123, incorporated herein by reference in its entirety. Solutions like the one described in the '123 patent do not recover heat, but rather reduce the amount of vapor released from the dishmachine. Reduced vapor machines may be "ventless" and eliminate the need to install expensive, complicated, and material-intensive vents above the machine.

Figure 9:
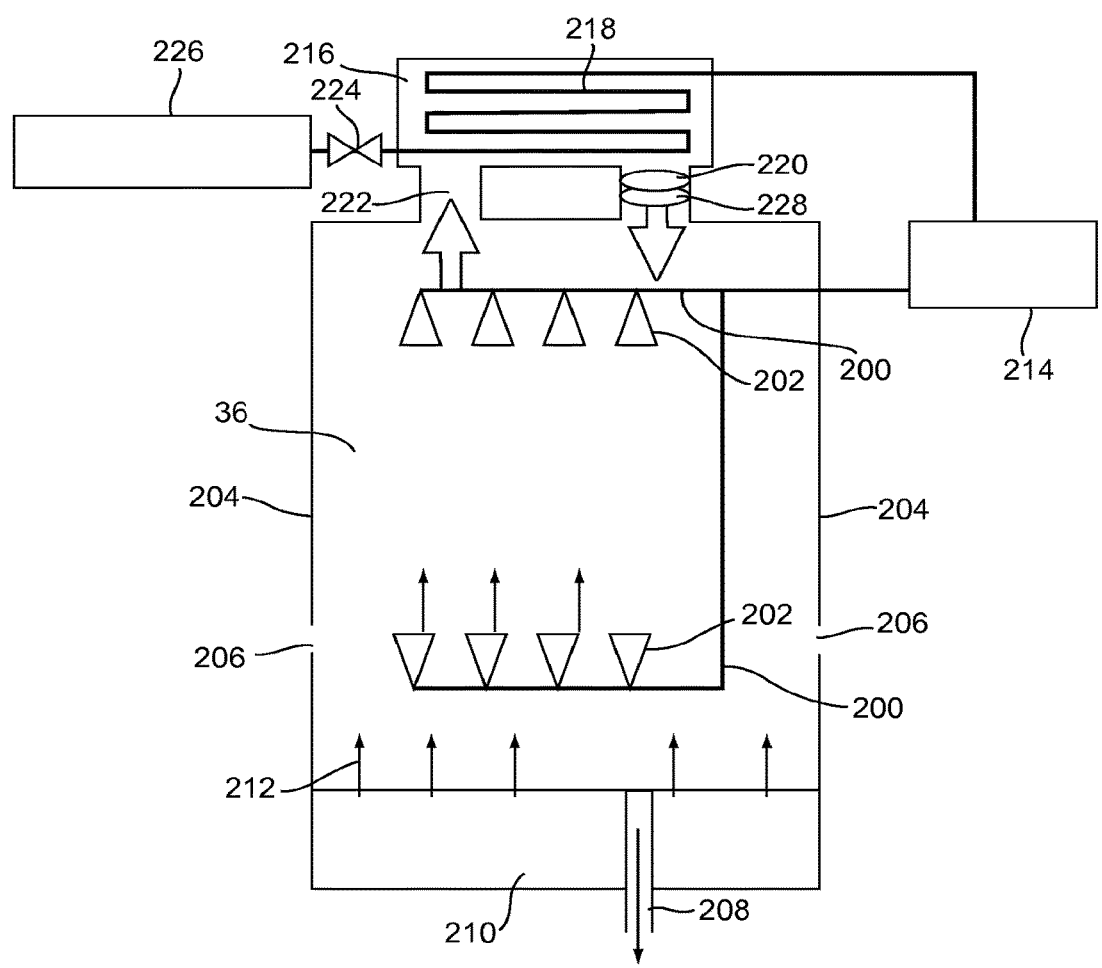
FIG. 9 shows a schematic of a recirculated vapor heat recovery and condensation system.

In an alternative configuration, the heat recovery system can be designed to exhaust back into the wash chamber as shown in FIG. 9. This is desirable because it allows for the vapor to make multiple passes through the heat exchanger, which means that any air exhausted out of the machine is additionally dryer and cooler. FIG. 9 shows a dishmachine with a wash chamber 36. The wash chamber 36 includes one or more spray arms 200 that emit a spray 202. The dishmachine includes doors 204 and exhausts 206. The dishmachine also includes a drain 208, a wash sump 210, and a heating unit 212, which may be electric. The dishmachine also includes a booster heater 214. During operation, hot, moist vapor exits from the wash chamber 36 through vent 222, where it enters the heat exchanger 216. Heat exchanger 216 includes coils 218. The hot, moist vapor passes over the coils 218, which remove the heat from the vapor, causing the water to condense and the water and cooled air to drain back into the wash chamber 36 through the drain 220. The drain 220 may optionally include a fan 228 to assist with moving air from the heat exchanger 216 back into the wash chamber 36. Freshwater from the freshwater supply 226 is pumped through the rinse valve 224 and into the interior of the coils 218 where it is heated up. The water leaving the coils 218 may optionally go through a booster heater 214 before being pumped back into the wash chamber 36 and arms 200.

This method has two distinct benefits: decreased dry times for ware and decreased heat loss from the dishmachine. The decreased dry times are driven by decreased vapor condensation on the ware in the wash chamber due to exhausting relatively dry and hot air back into the machine as well as the physical force of air acting upon the ware to dislodge or migrate water off the ware. To decrease dry times of ware (as compared to an equivalent machine without heat recovery/vapor condensation), the temperature of the ware must be higher than the dew point of the wash chamber to avoid the formation of condensation on the ware. This re-circulated design will remove vapor from the chamber air thus lowering the dew point to prevent condensation on the surfaces of the ware especially as the ware immediately begins to cool with the opening of the door. To decrease heat loss from the dishmachine, the chamber air is recirculated across the heat exchanger and back into the machine to avoid losing sensible and latent heat to the environment surrounding the dishmachine that may not be captured in a single pass across the heat exchanger. Said another way, this recirculation of chamber air across the heat exchanger and back into the chamber allows the system to capture heat from the air on multiple passes across the heat exchanger in a single dishmachine cycle. Additionally, the design of the heat exchanger may not be able to remove enough sensible heat from the chamber air to lower the temperature of the chamber air below the temperature of the air surrounding the dishmachine. This means that more heat will be preserved within the dishmachine if the makeup air is supplied back into the wash chamber by recirculated air as opposed to the cooler air surrounding the dishmachine. If cooler environmental air was drawn into the machine, it would remove energy from components of the machine, most notably the metal surfaces of the machine that come into contact with wash and rinse water. In this scenario, the wash and rinse water would then lose energy into the metal surfaces of the machine and draw more overall energy from the machine's power source.

Wash Time

In some embodiments, the dishmachine may be configured to alert the operator to the optimal time for washing subsequent racks or provide a historical average on how well the operator has been meeting this optimal time. Much like a hybrid car graphically alerts the operator to optimal gas usage, the dishmachine could graphically alert the operator to wash subsequent racks within a certain time frame. One method of doing this would be for the dishmachine or the controller to include a timer, where the timer starts counting down or up from some predetermined time when the dishmachine cycle starts or ends. Starting another wash cycle would reset the timer. The purpose of the timer would be to encourage the operator to start another rack within a specific time frame relative to the dishmachine cycle. Doing so would reduce energy costs by ensuring the dishmachine is utilizing its least costly source of heat and minimizing idle time in which the available heat is not being used to clean dishes. Another graphical output could be a red, yellow, or green indicator to indicate historical efficiency averages where red would be poor, yellow would be better, and green would be best. In this embodiment, more cycles run before the timer expired would improve a historical average from red (poor) to yellow (better) to green (best). An additional benefit of this technology would be maximized throughput of the machine, as well as reduced labor time required to complete the ware washing. Instead of or in addition to graphically showing this on the dishmachine or the dishmachine controller, the information could be logged and included in a report. The report could be given to a customer or used for training. Further, the dishmachine could be programmed to emit an audible noise when the timer starts, when the timer is about to run out, or when the timer runs out, to alert an operator in the area of the dishmachine that the previous cycle has been completed and the next dishmachine cycle should be started.

Material Savings

In addition to water and energy, dishmachines require large amounts of other materials with two significant examples being the materials used to make the actual dishmachine and the various chemical compositions used in the dishmachine during a cycle. Reducing or extending the life of the materials used to make the dishmachine is important for several reasons. For example, raw material prices on metal are increasing, making articles made from metal more expensive. Further, once the dishmachine has completed its useful life, materials that cannot be cost effectively reused or recycled are sent to landfills. And the various components of dishmachines may break or need to be repaired or replaced overtime. Simplifying the design of the machine simplifies repairing and maintaining the machine.

The chemical compositions used in the dishmachine are critical to getting clean, shiny, and spotless dishes, pots and pans, utensils, and glasses. Dirty dishes, pots and pans, utensils and glasses can have serious health consequences and negatively affect a consumer's perception of a restaurant. If a restaurant does not see the results they are getting, the first place they look is at the chemistry, not the water or the machine. Therefore, it is paramount that the chemistry used in the dishmachine is able to overcome whatever changes and variations occur in the volume, temperature and quality of the water, the dishmachine design, and any other variable in the dish washing process. With that in mind, the tendency may be to overuse the amount of chemical compositions and rely on the strongest chemicals available. The present disclosed dishmachine strategically uses the chemical compositions in a way that uses less chemistry but still cleans the articles.

The articles that are cleaned in a dishmachine experience different types of soils. For example, pots and pans are soiled with large amounts of starch, sugar, protein, and fatty soils. In contrast, glasses are not typically heavily soiled but have hard to remove soils like lipstick, coffee and tea stains. In some embodiments, the dishmachine uses dish racks with unique identifiers to alert the dishmachine of the article in the rack. Once the dishmachine identifies the type of article in the rack, it can modify the dishmachine cycle in a manner that selects the various cycles, times, temperatures, and chemical compositions needed to clean that article without using too much of anything for that particular article. For example, running a wash cycle with chemical compositions that are effective at cleaning pots and pans would likely be too much chemistry for a rack that is full of glasses. Rack identification allows a dishmachine operator to use the correct type and concentration of chemistry for the article to be cleaned. And by not overusing chemistry, the operator can use less chemistry overall while still seeing the expected cleaning performance results. An exemplary rack identification system is described in U.S. Pat. Nos. 7,437,213 and 6,463,940, which are incorporated by reference herein in their entirety.

A rack identification system could be realized through the use of a Radio Frequency Identification (RFID) tag as discussed in U.S. Pat. Nos. 7,437,213 and 6,463,940. An embodiment of this type of RFID rack identification system could make use of disc-shaped RFID tags encased in a plastic or epoxy/PPS case. These tags are designed to withstand the water, chemical and temperature environments in dishmachines and are well-suited to use in a dishmachine. More specifically, tags with low-frequency (LF), for example, between 125 KHz or 148 KHz, or preferably with high-frequency (HF), for example 13.56 MHz and above operating frequencies can be utilized for these applications. Some examples of these tags are available from Texas Instruments, HID Global and SmarTrac.

Figure 11A:
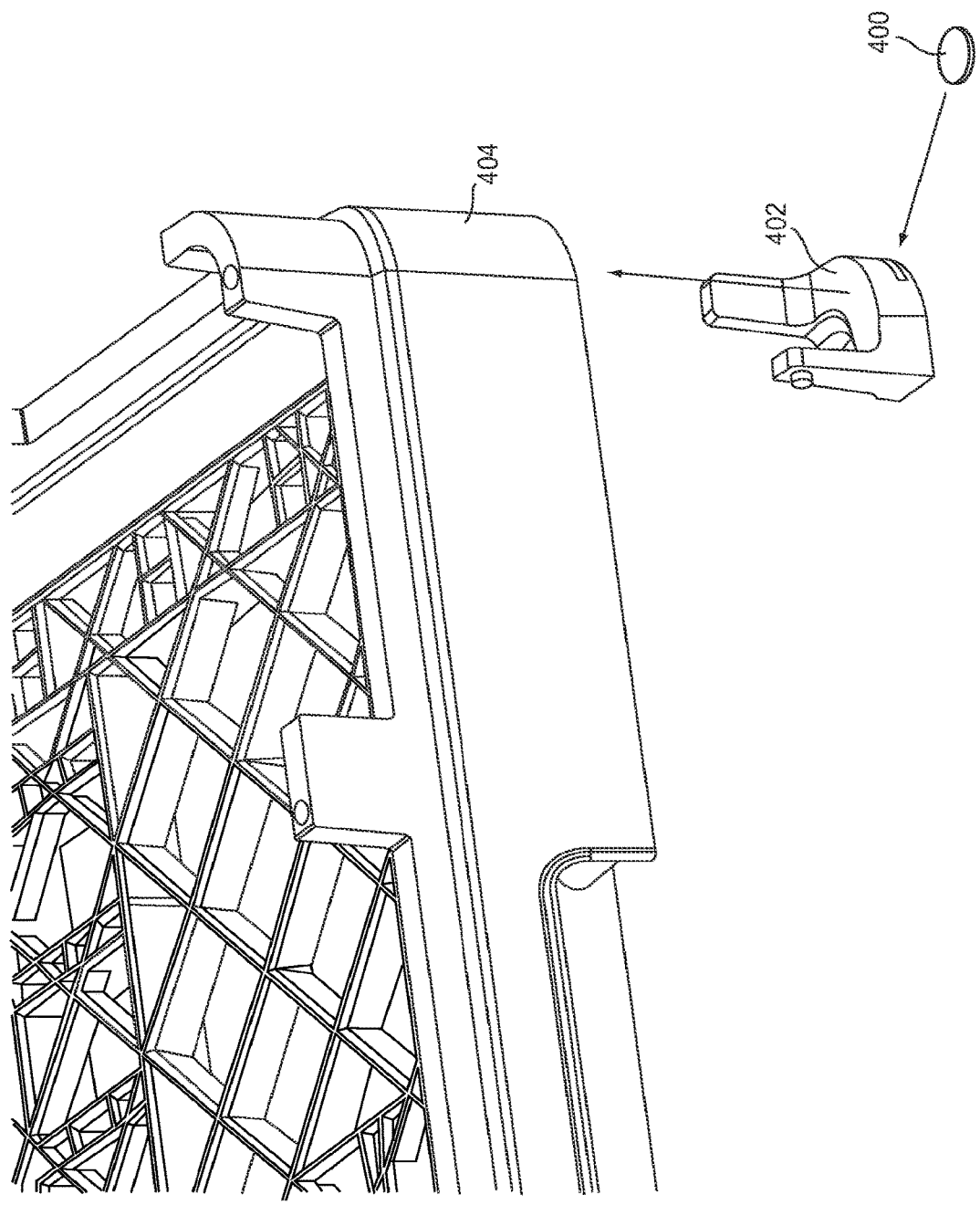
FIGS. 11-A and 11-B show schematics of an RFID tag inserted into a dish rack.
Figure 11B:
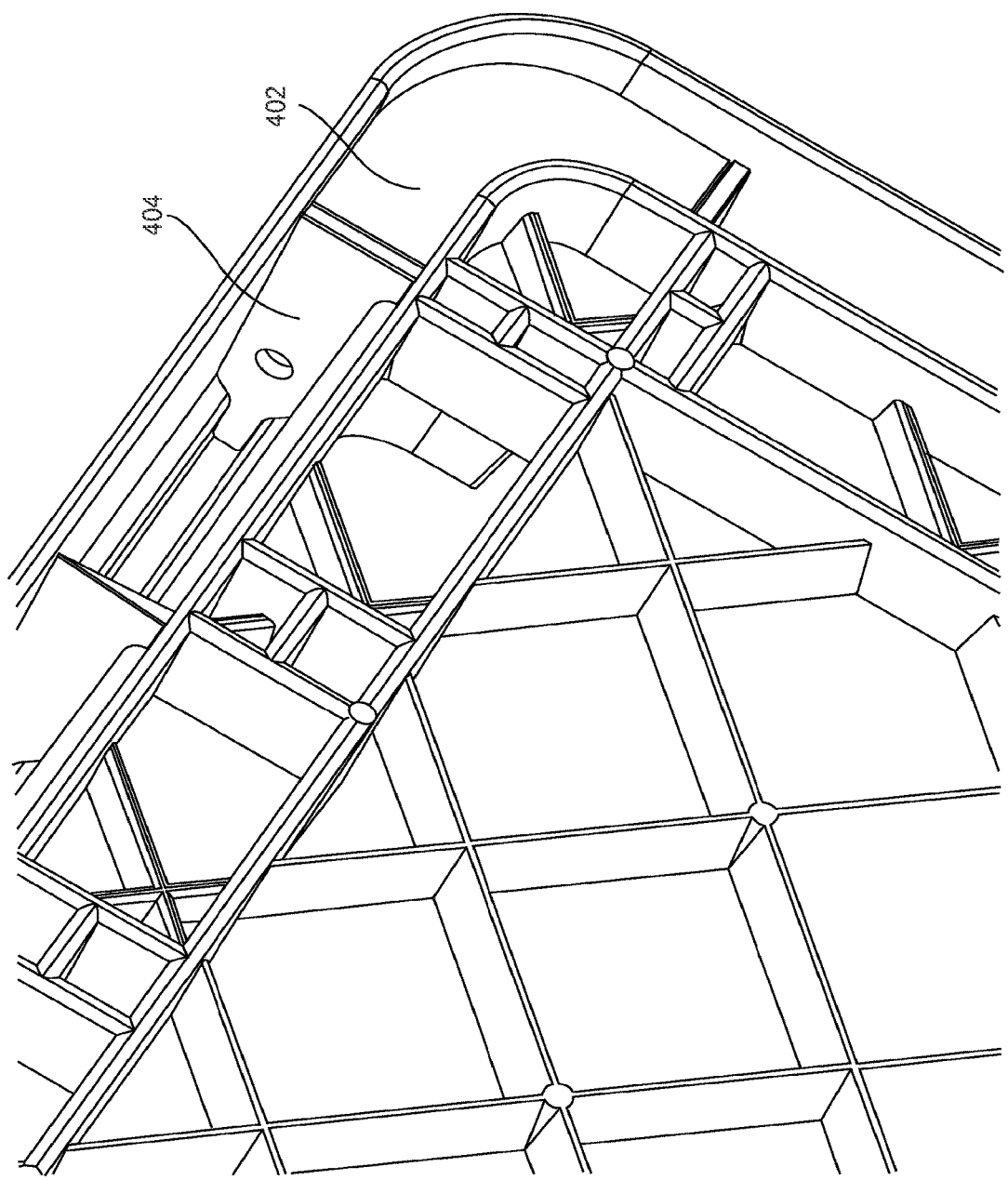

These RFID tags may be integrated into the dishmachine rack in many ways. They may be physically attached to the rack by use of a fastener, may be molded directly into the rack, or may be attached to the rack with a molded or machined clip or bracket. They may be located at any location on the rack, but preferably will be located along the outside edge of the rack, so they do not interfere with the spray of water that cleans the dishes. Preferably the mounting feature allows the RFID tag to be attached to both new and pre-existing racks. One method of doing this is with an injection molded bracket that is designed to hold the RFID tag in a specific position on the rack, and can be inserted into many types of racks. A particularly preferred location for the RFID tag is in a horizontal location close to the bottom of the rack, in the corner of the rack. This is a location that places the tag in a consistent location, which can be read through an antenna located just below the rack guide in the dishmachine. The size of tags for horizontal use in the corner of the racks must not be too large or the water spray will be blocked. Preferred tags are between 10-30 mm, or 15-19 mm in diameter. FIGS. 11-A and 11-B show an example of an RFID tag 400 inserted into a clip 402 that is then inserted into a rack 404.

There are several ways in which it would be possible to attach the tag bracket to the dish rack, such as a fastener, a screw, a push-in plastic rod, a circular protrusion that would fit into a hole in the rack, a small horizontal rib that would snap in to a matching slot feature on the rack, or by using a clip modified either during molding of the rack or the rack may need to be retrofitted.

The RFID reader electronics and reader antenna are integrated into the dishmachine in order to read the identification of the rack inserted into the machine. To select the correct chemistry and dishmachine cycle characteristics to use for a rack, it is helpful for the rack identification to be read prior to or very early during the dishmachine washing cycle. The rack RFID tag could be read outside of the dishmachine, or preferably inside of the dishmachine, to avoid reading tags on other racks that might be in close proximity to the reader antenna outside of the dishmachine. Furthermore, it is preferable to locate the antenna below the location where the rack is located in the dishmachine. If the antenna is positioned horizontally, it can read longer distances with a horizontally positioned RFID tag in the rack. It is preferable to read the tag while the rack is being inserted into the dishmachine, instead of reading after it is fully inserted.

The identification of the type of dish rack can help configure the process used to clean the ware in that specific dish rack, can create trends and historical data on problems encountered during the wash process, the general operation of the machine (e.g., how often it is drained), and the type of ware washed during particular times and days of the week, and can help create reports to improve management of a dish washing facility.

Selected Chemistry

In some embodiments, the disclosed dishmachine uses combinations of chemical compositions to achieve improved cleaning results. An example of such a combination is using chemical compositions with opposite pH values. Exemplary combinations include using alkaline and acidic compositions in alternative alkaline-acid-alkaline or acid-alkaline-acid sequences. The chemical compositions could be dishmachine pre-soaks, detergents, rinse aids, and the like. The pH of the alkaline compositions can range from about 7 to about 14, from about 9 to about 13, or from about 10 to about 12. The pH of the acidic composition can range from about 0 to about 7, from about 1 to about 5, or from about 2 to about 4. When using combinations of chemical compositions, it may be desirable to apply the compositions in certain ways. For example, in some embodiments, the acid composition may be applied through the rinse arm of the dishmachine, through spray nozzles mounted on the top, bottom and top, or bottom of the dishmachine, through a separate arm (such as a secondary rinse arm) of the dishmachine, through nozzles on the rinse arm, or a combination of these. The acidic composition may be dosed into the water holding tank of the dishmachine, or it may be injected into the flowing stream of water. Additional embodiments using alkaline and acidic compositions are described in U.S. Pat. Nos. 7,942,980 and 8,092,613, the disclosures of which are incorporated by reference herein in their entirety.

Deliming

In some embodiments, the dishmachine may incorporate an automatic or smart delime cycle to periodically remove lime scale from the walls and components inside of the dishmachine and dishmachine components. Traditional dishmachines are delimed by pouring deliming chemical into the wash tank of the machine and running the wash pump for a specified duration. This process does not allow deliming chemical to circulate through the dishmachine rinse system since there are no provisions to inject the deliming chemical into the freshwater supply of the dishmachine and the wash pump does not circulate water through the rinse system. One possible solution to this is to inject deliming chemistry at the freshwater entrance point to the dishmachine, this chemistry may be part of, or separate from chemistry already used in the normal dishmachine cycles. This method of injection will ensure all fluid carrying surfaces of the dishmachine can be delimed. Furthermore, in a dishmachine with a pumped rinse system, the deliming chemistry may be injected into the water tank that stores the water for the pumped rinse. The frequency of the deliming operation will be determined by environmental variables such as water quality. The dishmachine controller may have provisions to provide an indication that a delime cycle is necessary.

In a dishmachine that utilizes multiple tanks with a diverter to control which tank water is directed to, it would be possible to utilize a water solution with chemistry suited to deliming that resides or is pumped into one tank for deliming in the other tank. This would be done by running the pump connected to the tank with the deliming chemistry while using the diverter to redirect the water into the other tank. After sufficient water with deliming chemistry has been directed into the other tank, it would be possible to use the pump connected to the other tank to pump water with deliming chemistry through the plumbing and rinse arms of this other tank, resulting in deliming of the surfaces of this plumbing and rinse arms, in addition to deliming of this second tank.

The Dishmachine Controller

In some embodiments, the dishmachine or the dishmachine controller is programmed to select cycle parameters based on the type of ware to be washed. Cycle parameters could include the cycle time, cycle sequence, water temperature, chemical composition sequence, chemical composition concentration, and the like. Selecting dishmachine parameters to correspond to the ware to be washed can result in using less water, energy, and material (chemistry). In some embodiments, the dishmachine or dishmachine controller can be programmed to select cycle parameters that are harder to change in real time such as water temperature, or the detergent concentration of the wash tank. Some parameters such as cycle time are easy to change rack to rack. But, water temperature may be difficult to change rack to rack because of the time required for the water to cool or heat up. Likewise, changing the detergent concentration of the wash tank is difficult to change in real time rack to rack without dumping and refilling the tank for each rack. An alternative to real time adjustment is to select dishmachine parameters that reflect the soil most likely to be encountered by the dishmachine. The "most likely soil" may be determined by the time of day, day of week, day of month, day of year, and it may be determined by the nature of the restaurant or location. For example, early in the day, restaurants are prepping entrees for lunch and dinner. During this time of day, a dishmachine is more likely to see pots and pans. Accordingly, during the hours of 4:00 am and 9:00 am, the dishmachine could be programmed to clean pots and pans, which may mean a higher concentration of detergent in the wash tank, high water temperatures, and longer dishmachine cycles. Later in the day, for example during the lunch and dinner hours, the dishmachine is likely going to see plates and bowls and could be programmed to have wash temperatures, rinse temperatures, and detergent concentrations that correspond to washing more dishes. And, at the end of the day, after dinner, a restaurant may see more glasses, in which case the dishmachine may be programmed to have wash temperatures and rinse temperatures that correspond to washing glasses, and a higher concentration of rinse aid to make sure that the glasses are spotless. These parameters are exemplary only. In some embodiments, the dishmachine or controller could be programmed for the type of foodsoil to be encountered on that particular day of the week, date, or month to account for reoccurring events such as holidays. In some embodiments, if it is found that a specific set of temperatures is beneficial and these temperatures are higher than the minimum required temperatures, the logic may be programmed to more broadly determine the likely dishmachine use times and target the higher temperatures at these times to avoid the increased energy usage during idle times. In some embodiments, the dishmachine or controller could be programmed for the type of food soil most likely to be encountered at a particular location. Examples could include detergents designed to remove starchy soils at an Italian restaurant, or detergents designed to remove coffee and tea stains at a coffee shop. In this example a set of pre-programmed parameters would then be used to help remove the particular food soils.

Configuration of the dishmachine to run under different operational parameters based on time of day, day of the week or other controlling parameters could be programmed into the operational parameters of the dishmachine initially or when it is configured for operation in a specific location. Alternatively, the configuration of these operational parameters could automatically take place through collection of historical data on the operation of the machine obtained through rack identification functionality. For example, cumulative data on the number of racks of different type of ware that is washed during specific time periods during the day or days of the week could be used to automatically adjust the chemistry, cycle processes, etc. to best wash the type of ware expected during that time. In this way, the operational parameters could automatically adjust over time as the controlling parameters change, which might occur seasonally, for example.

Other dishmachine functionality not directly related to individual cycle operation can also be adjusted based on either manually configured values or automated processes. For example, automatic tank drain and refill, either complete or partial, to improve the cleanliness of the water in the tanks, could be adjusted based on the type of ware being washed. With the example above, if pots and pans are cleaned between 4:00 am and 9:00 am, more frequent tank drain and refill processes could be utilized. Alternatively, this functionality could be determined by collecting historical data through rack identification and setting drain and refill functionality based on cumulative data over time.

In some embodiments, the dishmachine may include an enclosure to help protect the machine and its internal components from the environment. The dishmachine environment is subject to higher than normal ambient temperatures and humidities as well as the potential for direct water spray downs. Regulatory standards help to protect against these types of factors to an extent, but may not ensure desired reliability is met.

In some embodiments, the dishmachine or controller can be used to determine the optimal mix of the types of racks needed by a customer based on the frequency of use of each rack type. For example, if a dishmachine or controller determines that ten glass racks are washed for each plate rack, a recommendation can be made to adjust the number of each type of rack used in the dish room so that the customer has ten times the number of glass racks as plate racks. Likewise, similar data could be collected to estimate the number of uses of each type of ware. For example, the number of racks of a particular type of ware could be counted and multiplied by the number of items in the rack. That number could be divided by the total number of that type of ware in circulation to estimate the number of uses. A customer could use that number of uses to either anticipate when to order replacements or for warranty purposes on the ware. Furthermore, this data could be used for reporting to the customer and recommendation of adjustment of processes to improve the washing process; for example if the data shows that more glass racks are being washed than expected, processes could be examined to determine if racks are not being filled prior to washing, or if conditions are resulting in substandard washing performance, requiring that glasses be rewashed to obtain adequate cleaning.

The above specification, examples and data provide a complete description of the manufacture and use of the disclosed dishmachine. Since many embodiments of the disclosure can be made without departing from the spirit and scope of the invention, the invention resides in the claims.

We claim:
1. A dishmachine comprising:
an enclosure defining a wash chamber comprising at least one spray arm mounted therein and at least one spray nozzle on the spray arm, the enclosure further comprising a door and a vent;
a heat recovery system comprising:
  a. a first flow path in fluid communication with the wash chamber through the vent, the first flow path comprising a first end disposed adjacent to the vent, a second end positioned opposite of the first end, and a drain, wherein the drain is in fluid communication with the wash chamber and adapted to drain condensate from the first flow path into the wash chamber, and wherein the first flow path further comprises an exhaust port positioned at the second end, and wherein the exhaust port is in fluid communication with the wash chamber and with an exterior of the dishmachine when the door is in a closed position;
  b. a second flow path extending between and in fluid communication with an external water source and the wash chamber;
  c. a refrigerant-boosted heat exchanger circuit comprising a closed loop circuit filled with refrigerant fluid, the circuit comprising a first coil extending into the first flow path and constructed and arranged to absorb heat from fluid in the first flow path; and a second coil extending into the second flow path and constructed and arranged to release heat into fluid in the second flow path; and
an integrated water conditioning system.

2. The dishmachine of claim 1, wherein the integrated water conditioning system is located on the dishmachine.

3. The dishmachine of claim 1, wherein the integrated water conditioning system is selected from the group consisting of a water softener, a capacitive deionization system, a reverse osmosis system and an ion exchange resin.

4. The dishmachine of claim 3, wherein the integrated water conditioning system further comprises a conductivity probe.

5. The dishmachine of claim 1, the heat recovery system further comprising a fan constructed to draw air from the wash chamber into the first flow path.

6. The dishmachine of claim 1, further comprising a booster heater.

7. The dishmachine of claim 1, wherein the first flow path comprises an inlet port between the first flow path and an exterior of the dishmachine.

8. The dishmachine of claim 1, wherein the second flow path further comprises a tank external to the heat recovery system.

9. The dishmachine of claim 1, wherein the heat recovery system has a heat exchange capacity that exceeds a heat load produced by the dishmachine.

10. A dishmachine comprising:
an enclosure defining a wash chamber comprising at least one spray arm mounted therein and at least one spray nozzle on the spray arm, the enclosure further comprising a door and a vent;
a heat recovery system comprising:
   a. a first flow path connecting the wash chamber and an exterior of the dishmachine, wherein the first flow path comprises a first end comprising the vent and a second end comprising an exhaust port positioned opposite of the first end, and a drain, wherein the drain is in fluid communication with the wash chamber; and
   b. a second flow path extending between and in fluid communication with an external water source and the wash chamber,
   wherein the heat recovery system is arranged to transfer heat from fluid in the first flow path into fluid in the second flow path; and
an integrated water conditioning system.

11. The dishmachine of claim 10, wherein the integrated water conditioning system comprises a water softener system, a capacitive deionization system, reverse osmosis system, an ion exchange resin, or a combination thereof.

12. The dishmachine of claim 11, wherein the integrated water conditioning system is a water softener system.

13. The dishmachine of claim 11, wherein the integrated water conditioning system is operatively connected with a controller.

14. The dishmachine of claim 13, wherein the controller is configured and adapted to adjust an amount of water treatment supplied by the integrated water conditioning system.

15. The dishmachine of claim 14, wherein the integrated waterconditioning system comprises a conductivity probe and the controller is configured and adapted to adjust the amount of water treatment based on information received from the conductivity probe.

* * * * *

UNITED STATES PATENT AND TRADEMARK OFFICE
CERTIFICATE OF CORRECTION

PATENT NO. : 10,314,461 B2
APPLICATION NO. : 15/014670
DATED : June 11, 2019
INVENTOR(S) : Ellingston et al.

It is certified that error appears in the above-identified patent and that said Letters Patent is hereby corrected as shown below:

In the Claims

Column 18, Line 16, Claim 15: "waterconditioning system comprises" should read --water conditioning system comprises--

Signed and Sealed this
Fifth Day of November, 2019

Andrei Iancu
*Director of the United States Patent and Trademark Office*